(12) United States Patent
Xiao et al.

(10) Patent No.: US 10,320,489 B2
(45) Date of Patent: Jun. 11, 2019

(54) CHANNEL ESTIMATION USING INTRA-SYMBOL FREQUENCY DOMAIN AVERAGING

(71) Applicant: ZTE Corporation, Shenzhen (CN)

(72) Inventors: Xin Xiao, Parsippany, NJ (US);
Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/853,449

(22) Filed: Dec. 22, 2017

(65) Prior Publication Data

US 2018/0183527 A1      Jun. 28, 2018

Related U.S. Application Data

(60) Provisional application No. 62/438,436, filed on Dec. 22, 2016.

(51) Int. Cl.
| | | |
|---|---|---|
| *H04L 27/06* | (2006.01) | |
| *H04B 10/69* | (2013.01) | |
| *H04L 25/02* | (2006.01) | |
| *H04B 10/079* | (2013.01) | |
| *H04B 10/11* | (2013.01) | |
| *H04B 10/548* | (2013.01) | |
| *H04L 27/38* | (2006.01) | |

(52) U.S. Cl.
CPC ..... *H04B 10/6972* (2013.01); *H04B 10/0795* (2013.01); *H04B 10/11* (2013.01); *H04B 10/548* (2013.01); *H04L 25/0204* (2013.01); *H04L 27/3854* (2013.01)

(58) Field of Classification Search
CPC .............. H04L 27/2647; H04L 25/022; H04L 25/0204; H04L 25/0212; H04L 25/0202; H04L 27/3854; H04B 7/0626; H04B 10/6972
USPC .......................... 398/208; 375/260, 261, 340
See application file for complete search history.

(56) References Cited

U.S. PATENT DOCUMENTS

| | | | |
|---|---|---|---|
| 9,036,719 B2* | 5/2015 | Selen ..................... | H04L 5/0032 370/252 |
| 2006/0209974 A1* | 9/2006 | Yoshida .............. | H04L 25/0204 375/260 |
| 2010/0136919 A1* | 6/2010 | Sathananthan ..... | H04L 25/0232 455/67.11 |
| 2018/0205581 A1* | 7/2018 | Kim ......................... | H04L 5/00 |

\* cited by examiner

*Primary Examiner* — Don N Vo
(74) *Attorney, Agent, or Firm* — Perkins Coie LLP

(57) ABSTRACT

A channel estimation technique suitable for implementation at a digital communication receiver such as an optical signal receiver apparatus includes receiving, over a communication channel, a transmission comprising a sequence of modulated symbols, estimating, at multiple frequencies, estimated values of a channel transfer function of the communication channel and selectively revising the estimated values of channel transfer function by reducing glitches in the estimated values of the channel transfer function.

20 Claims, 18 Drawing Sheets

CHANNEL ESTIMATION USING INTRA-SYMBOL FREQUENCY DOMAIN AVERAGING

CROSS REFERENCE TO RELATED APPLICATIONS

This patent document claims the benefit of priority of U.S. Provisional Patent Application No. 62/438,436, filed on Dec. 22, 2016. The entire content of the before-mentioned patent application is incorporated by reference as part of the disclosure of this application.

TECHNICAL FIELD

This patent document relates to digital communication, and, in one aspect, multi-carrier optical communication systems.

BACKGROUND

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which operational and capital expenditure can be reduced.

SUMMARY

The present document discloses techniques for robust channel estimation using intra-symbol frequency domain averaging.

In one aspect, a method of digital communication, implementable at a receiver-side in a communication network, is disclosed. The method includes receiving, over a communication channel, a transmission comprising a sequence of modulated symbols, estimating, at multiple frequencies, estimated values of a channel transfer function of the communication channel, and selectively revising the estimated values of channel transfer function by reducing glitches in the estimated values of the channel transfer function. The revising is performed by comparing, at the multiple frequencies, a corresponding estimated value of the channel transfer function with smoothened values of the channel transfer function at the multiple frequencies and replacing, in a revised estimated channel transfer function, the corresponding estimated value of the channel transfer function with the smoothened value when a difference between the corresponding estimated value and the smoothened value is greater than a threshold.

In another aspect, an optical communication receiver apparatus comprising an optical receiver front end, a memory storing instructions and a processor is disclosed. The processor reads instructions from the memory and implements a method of estimating channel transfer function based on signals received from the optical front end. The method includes estimating, at multiple frequencies, estimated values of a channel transfer function of the communication channel, calculating, at a given frequency from the multiple frequencies, a first value based on a first number of estimated values of the channel transfer function at frequencies lower than the given frequency, calculating, at the given frequency, a second value based on a second number of estimated values of the channel transfer function at frequencies higher than the given frequency, calculating a candidate replacement value at the given frequency from the first value and the second value, comparing a difference between the candidate replacement value and the estimated value of the channel transfer function at the given frequency with a threshold, and replacing, in a revised estimated channel transfer function, the estimated value of the channel transfer function estimate with the candidate replacement value when the difference is greater than the threshold.

In another example aspect, the methods may be embodied as processor-executable code and stored on a computer-readable medium.

These, and other aspects, are disclosed in the present document.

DETAILED DESCRIPTION

Figure 1:
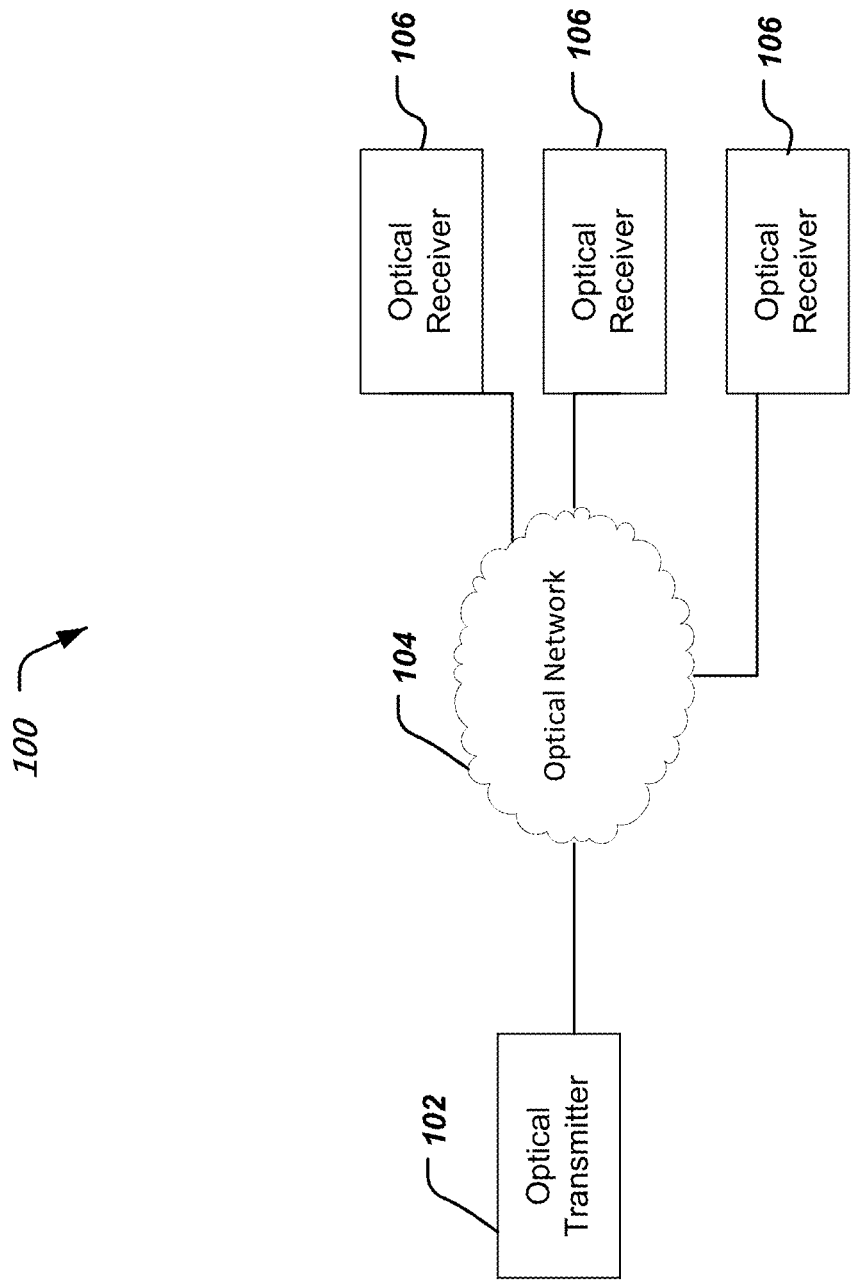
FIG. 1 is a block diagram of an example optical communication network.

In wireless and optical orthogonal frequency division multiplexing (OFDM) or discrete multitone transform (DMT) communication systems, channel estimation is an important step performed by many receivers. Channel estimation calculations are used to estimate the transmission channel over which signals are received and build a model for the transmission channel. In many communication systems, whenever the transmitter sends a data frame, a group of data so-called "training sequence" is attached typically at the beginning of the frame. A set of possible training sequences is already known to the receiver, so the receiver can estimate the transmission channel and build the model for it by comparing the received training sequence and the known training sequence. For example, assume a set of possible training sequence is known to both the transmitter and receiver, and a training sequence TS is sent from the transmitter to the receiver through the transmission channel. The received training sequence will be different from the sent training sequence TS depending on the transmission channel. Assume the received training sequence is TS'. Then a transmission function matrix Hx can be calculated by dividing the sent training sequence TS by the received training sequence TS': Hx=TS/TS'. This operation may be performed at many frequency locations within a frequency band to estimate the channel frequency response in that frequency band. Because of the noises of the transmission channel, the received training sequence TS' could be distorted irregularly, and then the calculated transmission function matrix Hx would be also irregular. A technique called Intra-symbol frequency-domain averaging (ISFA) is used to compensate for channel noise, and it can improve the system performance efficiently by decreasing the bit error rate (BER) for more than one order of magnitude.

The basic idea of ISFA is to compensate the adverse effect of noise by averaging adjacent data values. For example, assume each of the sent training sequence TS and the received training sequence TS' is a 2048-point sequence: TS=[$ts_1$, $ts_2$, $ts_3$, . . . $ts_{2048}$]; and TS'=[$ts'_1$, $ts'_2$, $ts'_3$, . . . $ts'_{2048}$]. Then, the generated transmission function matrix is Hx=[$hx_1$, $hx_2$, $hx_3$, . . . $hx_{2048}$], where $hx_i$=$ts_i/ts'_i$=1, 2, 3, . . . 2048. The ISFA method generates new Hx matrix Hx_isfa=[$hx\_isfa_1$, $hx\_isfa_2$, $hx\_isfa_3$, . . . $hx\_isfa_{2048}$] by averaging a number of adjacent hx values. Assume the ISFA window is 31, then $hx\_isfa_i$=($hx_{i-15}$+$hx_{i-14}$+ . . . +$hx_{i-1}$+$hx_i$+$hx_{i+1}$+ . . . +$hx_{i+14}$+$hx_{i+15}$)/31. In this way, the noises of each data can be statistically dissipated and compensated. The ISFA method is simple but very efficient, and thus it can improve the system performance by decreasing the BER by more than one order of magnitude.

In some embodiments described in this patent document, a modified ISFA method which is called "glitch-free ISFA method" may reduce/minimize abnormal burst noises during ISFA processing. By using the glitch-free method, the system performance can be improved by decreasing the BER by around 30%.

FIG. 1 depicts an optical communication system 100 in which the presently disclosed technology can be practiced. One or more optical transmitters 102 are communicatively coupled via an optical network 104 with one or more optical receivers 106. The optical network 104 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

Figure 2:
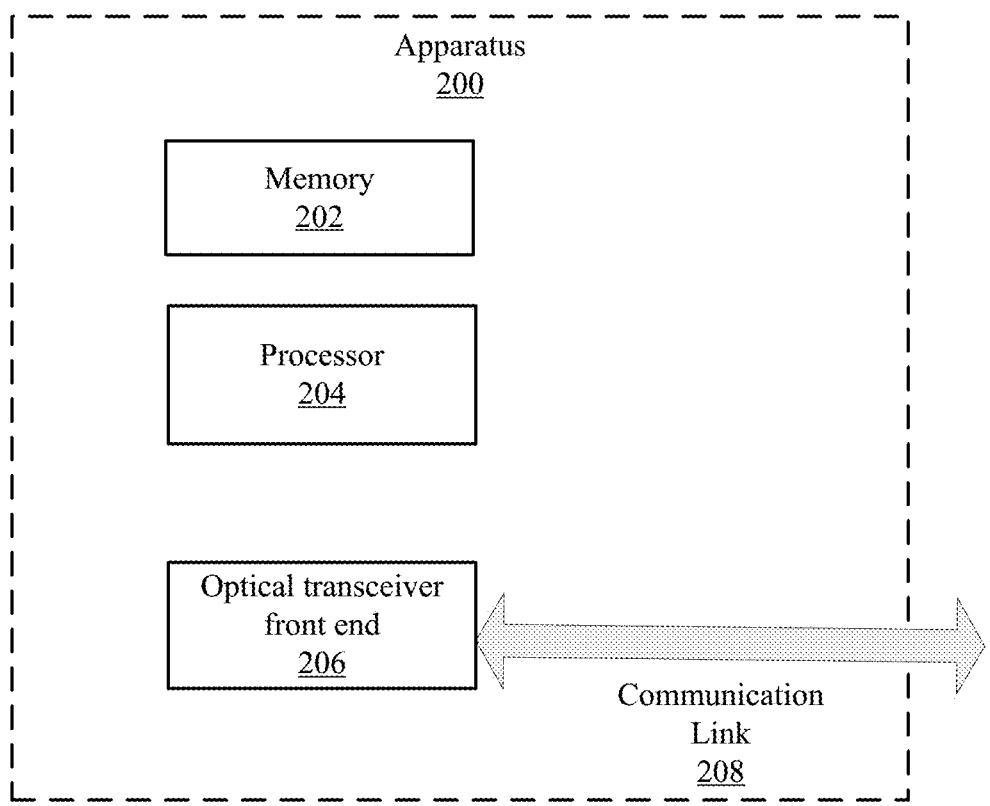
FIG. 2 is a block diagram of an example communication apparatus.

FIG. 2 is a block diagram of an example communication apparatus 200. The apparatus 200 may include one or more memories 202, one or more processors 204 and an optical receiver or transceiver front end 206 that is coupled with a communication link 208. The memory 202 may store processor-executable instructions and/or data during processor operation. The processor 204 may read instructions from the one or memories 202 and implement a technique described in the present document. The optical front end may be coupled to the processor and may receive transmissions from the communication link 208 and convert them into digital signals that are then processed by the processor 204 or other circuitry in the apparatus 200 (not shown in FIG. 2).

Figure 3:
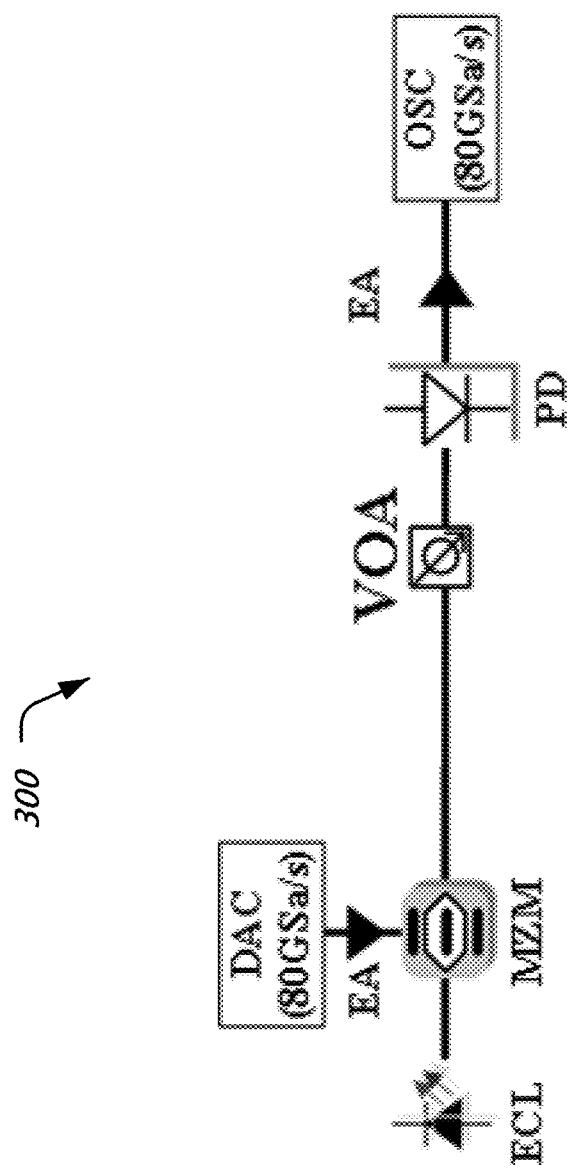
FIG. 3 shows an example experimental setup of an optical back-to-back DMT transmission system. DAC: digital to analog converter, MZM: Mach-Zehnder modulator, ECL: external cavity laser, VOA: variable optical attenuator, PD: photodiode, EA: electrical amplifier, OSC: oscilloscope.

FIG. 3 shows an example of an experimental setup 300 of an optical back-to-back discrete multitoned transform (DMT) transmission system. The following abbreviations are used in FIG. 3: (1) DAC: digital to analog converter; (2) MZM: Mach-Zehnder modulator; (3) ECL: external cavity laser; (4) VOA: variable optical attenuator; (5) PD: photodiode; (6) EA: electrical amplifier; and (7) OSC: oscilloscope. From left to right in FIG. 3, a DAC may receive digital samples, e.g., information bits, at the transmitter and convert into an analog signal that is used to modulate an ECL, and the resulting optical signal is transmitted over the VOA, which simulates a transmission channel. On the receiving side, a photodiode may detect the optical signal and convert to digital samples that are then fed into the receiver-side circuitry that performs some of the channel estimation operations described in the present document. In some embodiments such as experimental setups, an electrical amplifier amplifies the digital samples and presents the results to an oscilloscope for testing and calibration.

Figure 4:
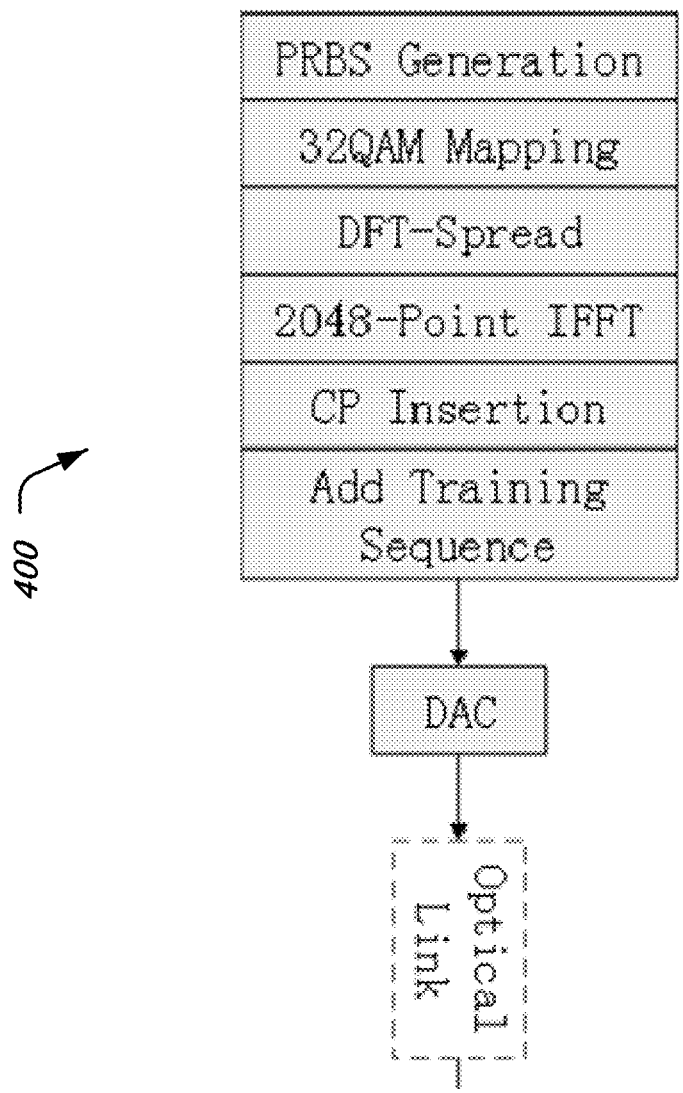
FIG. 4 shows an example function diagram of transmitter-side of an embodiment.

FIG. 4 shows an example functional diagram of a transmitter-side 400 of an optical communication system in an embodiment. From left to right in the drawing, a data source may be used to receive or generate data which is then mapped to constellation symbols. In experimental setups, the data source may be a pseudorandom binary sequence (PRBS). As an example, the PRBS data may be mapped to 32-QAM constellations. A discrete Fourier transform (DFT) spreading stage may process the mapped symbols, followed by an inverse fast Fourier transform (IFFT), e.g., a 2048-point IFFT. The output of the IFFT calculations may be converted into a signal for transmission by adding c cyclic prefix optionally adding a training sequence. The resulting signal may be converted from digital domain to analog domain and transmitted over an optical link.

Figure 5:
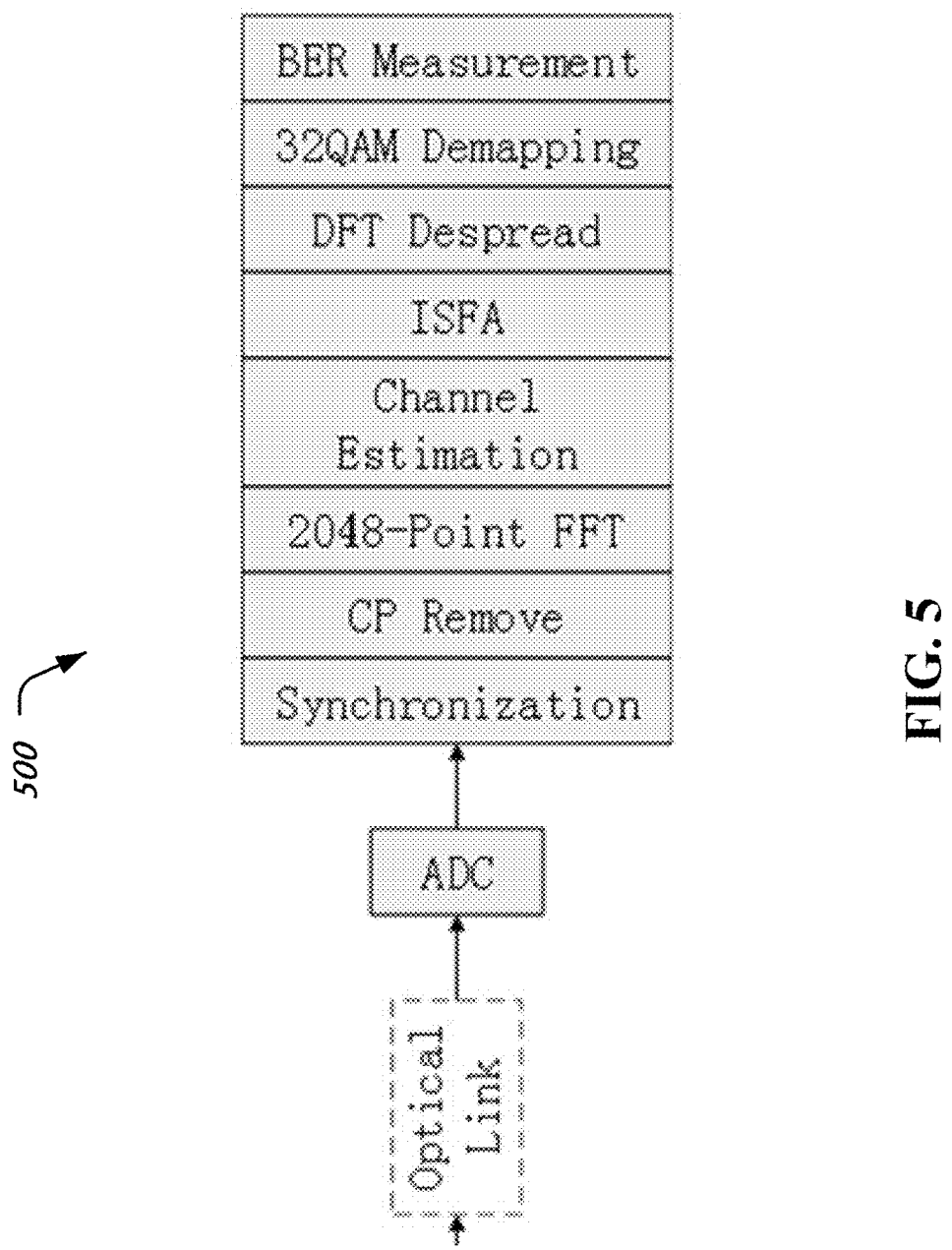
FIG. 5 shows an example functional diagram of the receiver-side embodiment.

FIG. 5 shows an example functional diagram of a receiver-side 500 of an optical communication system in an embodiment. The receiver receives signal transmissions from the optical link. At the front end, an analog to digital converter may generate a stream of symbols. The received and digitized signal may be processed through a synchronization stage or synchronizing with the transmitted signal, a cyclic prefix removal step, and an IFFT (e.g., 2048-point IFFT). The resulting signal represents frequency domain samples. The resulting signal is used to perform channel estimation, followed by intra symbol frequency domain averaging (ISFA). The results from ISFA may be used to perform digital despreading. The output of this stage may be demapped to recover constellations and information bits from the received optical signal. During experiments, the resulting data may be captured by a bit error rate measurement module that produces BER results.

Figure 6:
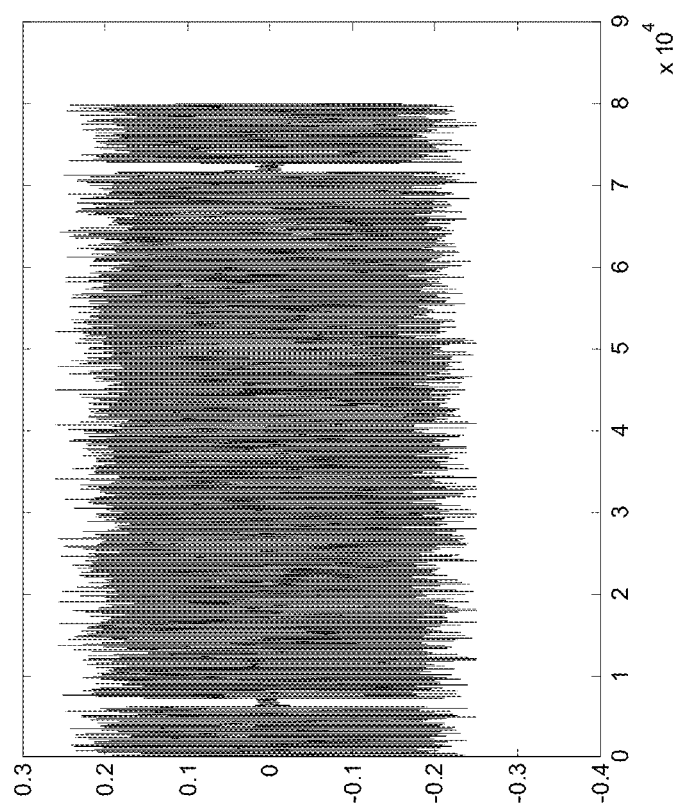
FIG. 6 shows a time domain plot of signal received from analog to digital conversion in an embodiment.

FIG. 6 shows a time domain plot of signal received from analog to digital conversion in an embodiment. The basic parameters of the experiment is: (1) Mapping method: 32QAM; (2) FFT size: 2048; (3) Using subcarriers: 600; (4) Cyclic prefix (CP) size: 32; (5) ISFA widow size: 31; (6) ADC sample rate: 80 Gbps; and (7) DAC sample rate: 80 Gbps.

Figure 7:
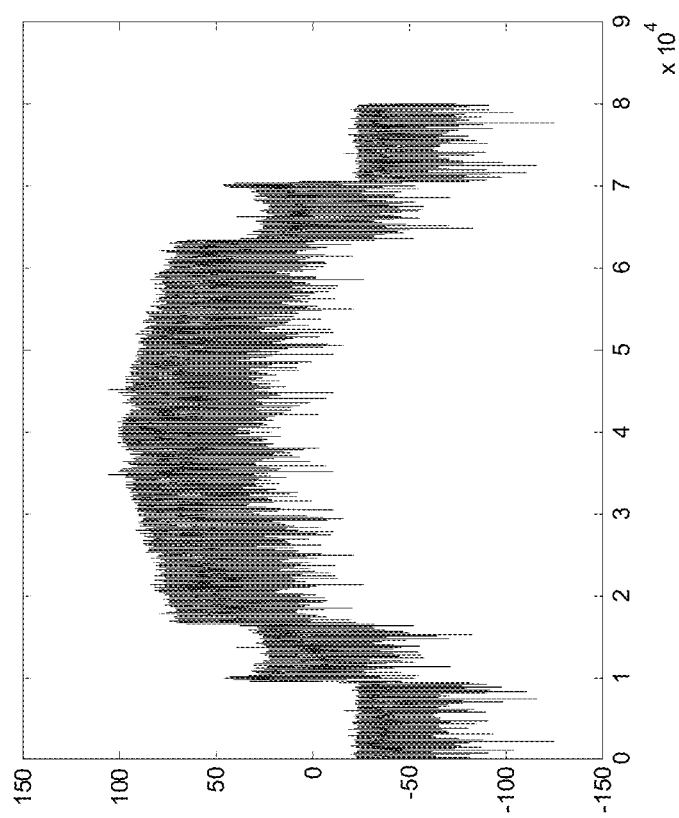
FIG. 7 shows a frequency domain plot of a signal received from analog to digital conversion in an embodiment.

The received signal after ADC sampling is shown in FIG. 6 and FIG. 7. FIG. 7 shows a frequency domain plot of a signal received from analog to digital conversion in an embodiment. The horizontal axis shows frequency in MHz and the vertical axis shows frequency gain normalized to 100 as the highest value.

Figure 8:
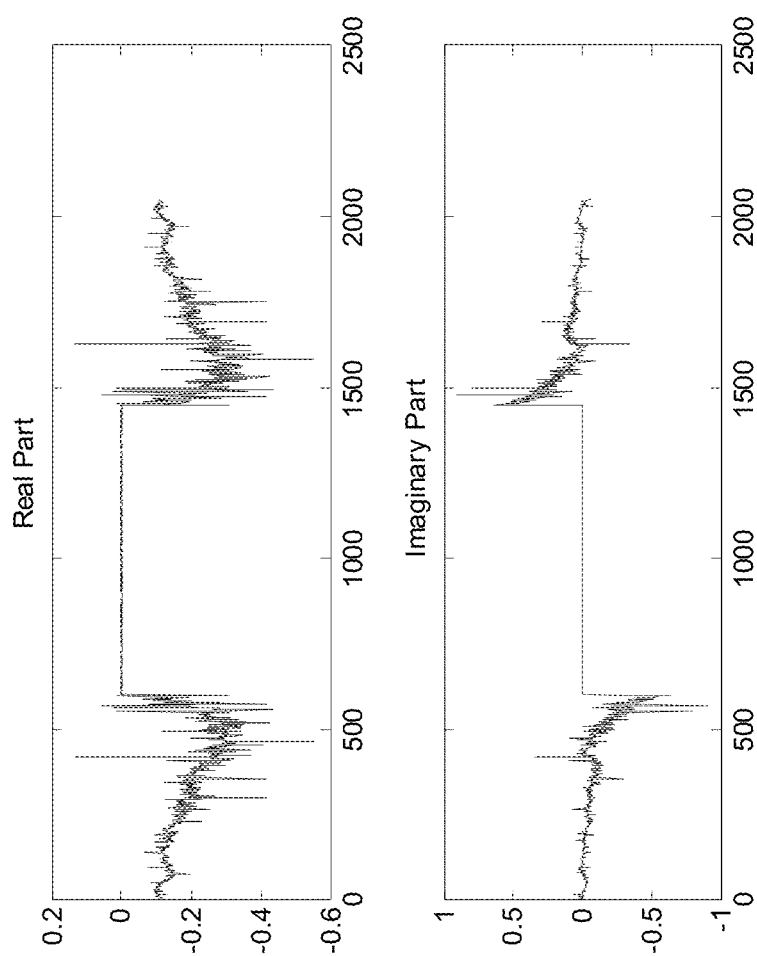
FIG. 8 shows channel transfer function before performing intra symbol frequency domain averaging (ISFA) in some embodiments.

FIG. 8 shows real and imaginary parts of channel transfer function before performing ISFA in some embodiments. The transmission function matrix Hx after channel estimation but before ISFA is shown in FIG. 8. As can be seen, the channel transfer function is not smooth and tends to have large variations in the frequency response. The horizontal axis shows transfer function from 0 to 2.5 GHz while the vertical axis shows dB gain. The real part and the imaginary part of the transmission function are separately shown in FIG. 8.

Figure 9:
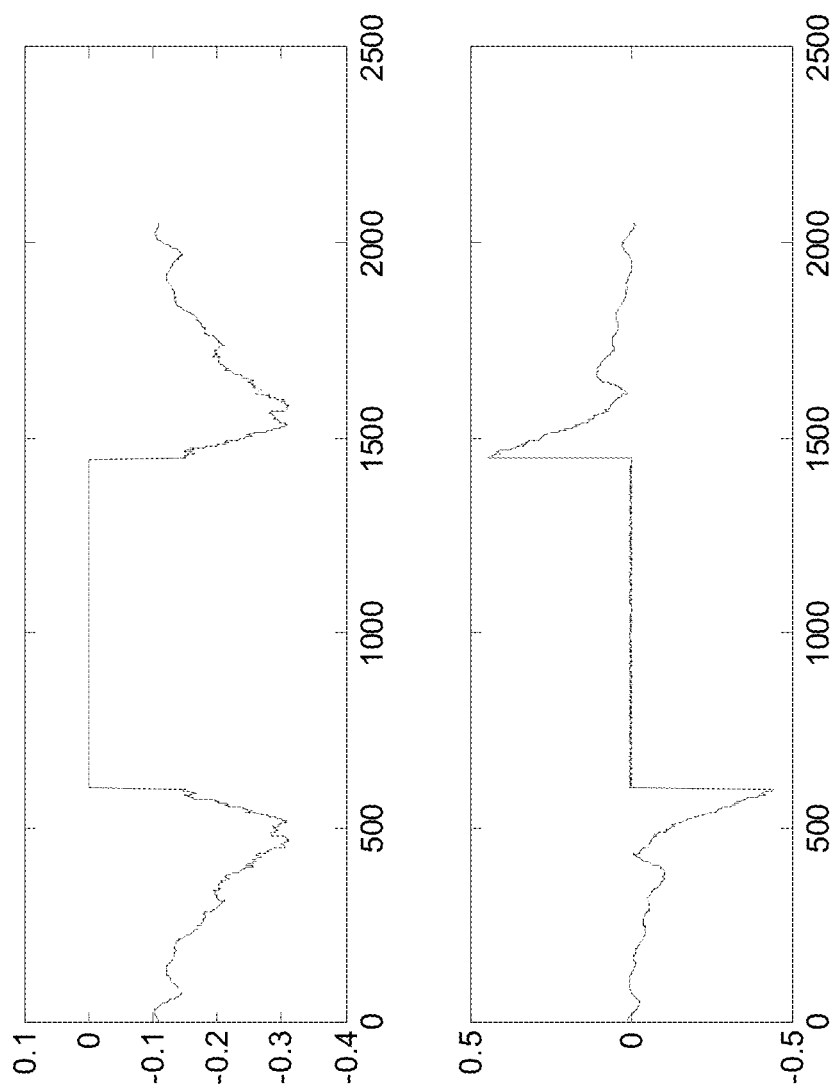
FIG. 9 shows channel transfer function after ISFA is performed in some embodiments.

FIG. 9 shows real and imaginary parts of channel transfer function after performing ISFA in some embodiments. The horizontal axis represents frequency sample points along a 2048-point Fourier transform and the vertical axis represents values of the coefficients. It can be seen from FIGS. 8 and 9 that the transmission function after performing ISFA has much less noise than the transmission function Hx before performing ISFA. Such a smoothing of the transfer function may improve the system performance.

Figure 10:
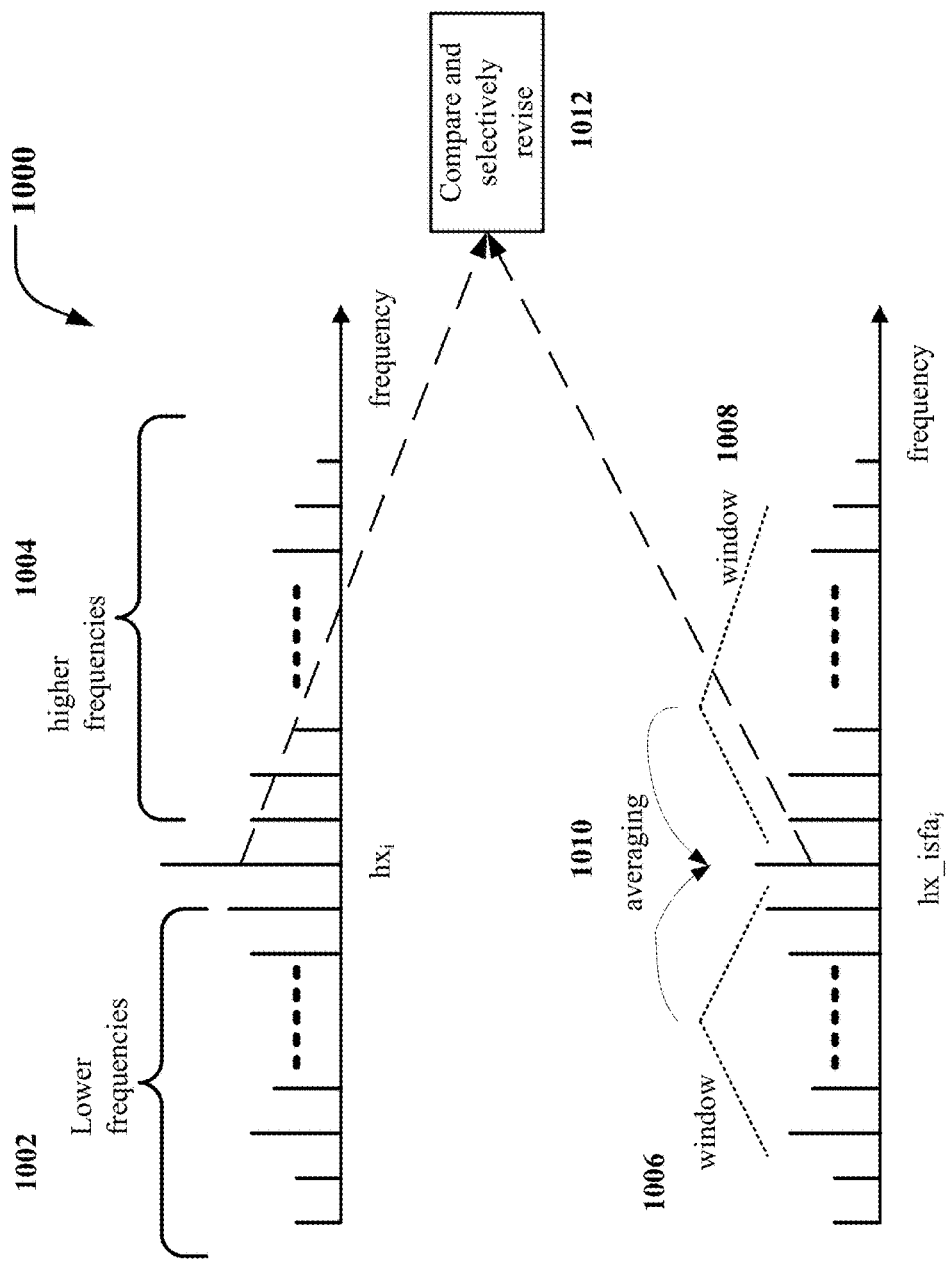
FIG. 10 shows an example of the computation of a glitch-free estimate.

FIG. 10 shows a depiction of an embodiment of a glitch-free ISFA technique 1000. Initially, a channel estimate may be obtained, as depicted by the upper left graph in which channel response estimates are plotted along the frequency axis. The estimate of channel at a given frequency location is represented by "$hx_i$." In addition, channel estimates may be available at a number of lower frequencies 1002 below the given frequency, and another number of frequencies 1004 greater than, or above, the given frequency. For example, the coefficients may represent a 1K or 2K or 4K granularity of frequency response estimate, as obtained at the output of an IFFT channel estimation step.

In the lower graph, a smoothing operation is depicted in which a lower window 1006 is used for calculating a smoothed value from a first number of lower frequencies and a higher window 1008 is used to calculate a smoothed value from a second number of higher frequencies. In some embodiments, the window sizes of windows 1006 and 1008 may be identical (e.g., 15 each). Alternatively, these windows could be selected to have different sizes. For example, near the left, or lower, edge of the channel, the lower window 1006 may be smaller in size. Similarly, near the upper edge of the channel frequency estimates, the upper window 1008 may have a smaller number of frequency estimates available for averaging. The result of averaging operation 1010 and the original estimate $hx_i$ may be compared and a decision may be made about whether to replace the estimate $hx_i$ with the averaging estimate $hx\_isfa_i$. This comparison operation may be performed on a frequency location by frequency location basis, spanning the entire range of the channel estimate. For ease of computation, in some embodiments, a same rule for revising the channel estimate may be used. For example, the difference between $hx_i$ and $hx\_isfa_i$ may be compared with a same threshold value. Alternatively, the threshold value may be dependent on the relative position of a frequency location within the channel frequency response. For example, near the center of the channel, where coefficients are expected to be larger in value due to the lowpass nature of the estimated channel frequency response estimate, a higher threshold may be used, while near the left and right end of the channel, a lower threshold value may be used for the selective revising of the estimates. For example, calculating the smoothened value of the channel transfer function may include lowpass filtering frequency domain estimate values and thresholding an output of the lowpass filtering. In this way, the receiver may revise the estimated channel transfer function and recover information bits from the optical transmission based on the revised estimated channel transfer function.

Figure 11A:
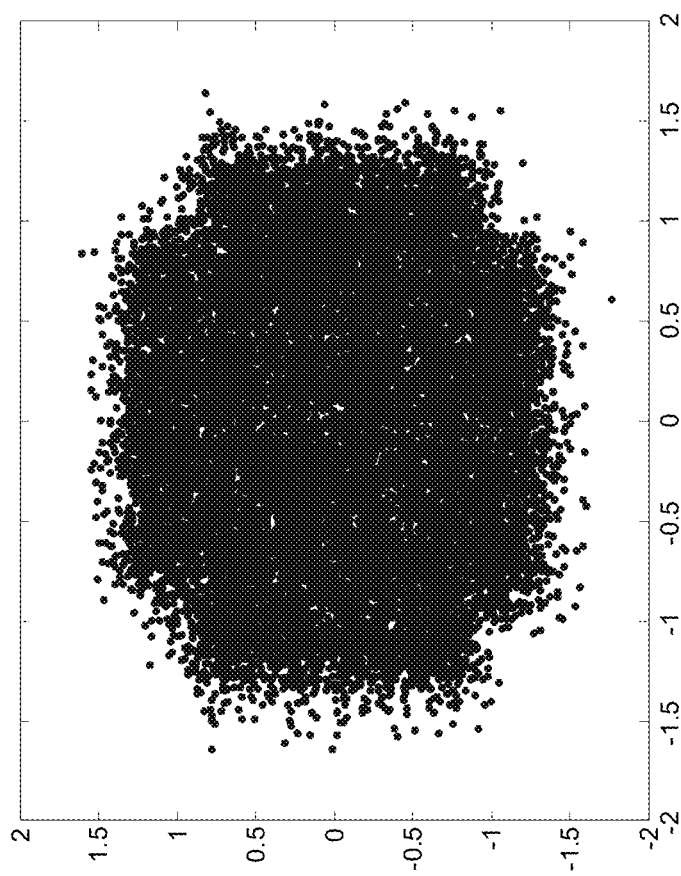
FIG. 11A shows an example of a constellation diagram without ISFA processing.
Figure 11B:
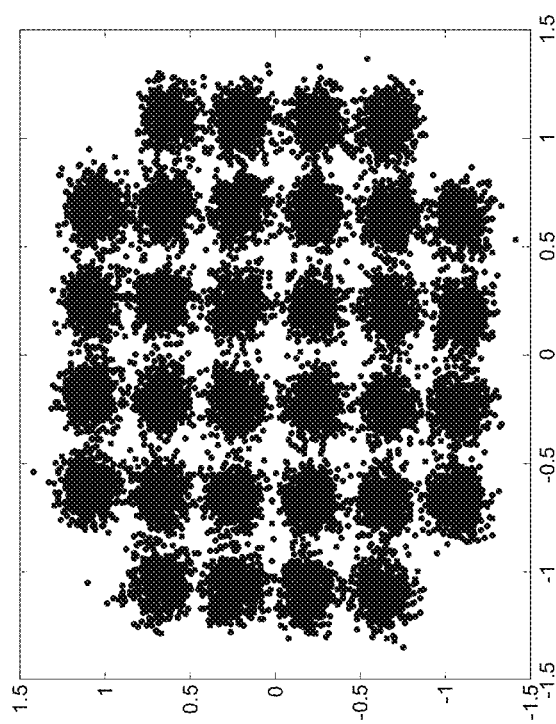
FIG. 11B shows an example of a constellation diagram with ISFA processing.

FIG. 11A and FIG. 11B show the constellation diagram of systems without or with ISFA processing. In some experiments, the BER for systems without or with ISFA were computed to be $6.65 \times 10^{-2}$ and $3.98 \times 10^{-3}$ respectively. In particular, FIG. 11A shows an example of a constellation diagram without ISFA processing, and FIG. 11B shows an example of a constellation diagram with ISFA processing. As can be seen, with ISFA processing, the influence of noise on constellation mapping at the receiver can be cleaned up and made more robust.

To explain the glitch-free ISFA method, referring back to FIG. 8, it can be seen that there are many noises in the waveforms of the transmission function matrix Hx, and the ISFA method is used to smooth these noises. If the waveforms of the transfer function illustrated in FIG. 8 is observed more carefully, it can be seen that there are two kinds of noises, one is regular noise which is smaller but almost everywhere, and the other is burst glitch which is much greater but only a few exist. The burst glitches are typically caused by the transmission errors, so if a receiver can eliminate these errors in the processing, the system performance can be improved. The disclosed techniques achieve, among other features, this elimination of burst glitches in channel transfer function estimates.

In some embodiments of the ISFA method, assume the ISFA window is 31, then $hx\_isfa_i = (hx_{i-15} + hx_{i-14} + \ldots + hx_{i-1} + hx_i + hx_{i+1} + \ldots + hx_{i+14} + hx_{i+15})/31$. Here, $hx\_isfa_i$ is the statistical average of $hx_i$, so normally the values of $hx_i$ and $hx\_isfa_i$ are similar, but if $hx_i$ is an error datum, which is a glitch, the value of $hx_i$ will be much different than $hx\_isfa_i$, if we set a threshold, we can distinguish the glitches and reduce/minimize them. For example, the threshold is set to be 0.1. If any $abs(hx_i - hx\_isfa_i) > 0.1$, the $hx_i$ will be replaced by $hx'_i = (hx_{i-15} + hx_{i-14} + \ldots + hx_{i-1} + hx_{i+1} + \ldots + hx_{i+14} + hx_{i+15})/30$, then the $hx\_isfa_i$ will be recalculated as: $hx\_isfa_i = (hx_{i-15} + hx_{i-14} + \ldots + hx_{i-1} + hx'_i + hx_{i+1} + \ldots + hx_{i+14} + hx_{i+15})/31$. Here, "abs" indicates an absolute value. In this way, we can obtain a new Hx and a new Hx_isfa as shown in FIG. 12 and FIG. 13.

Figure 12:
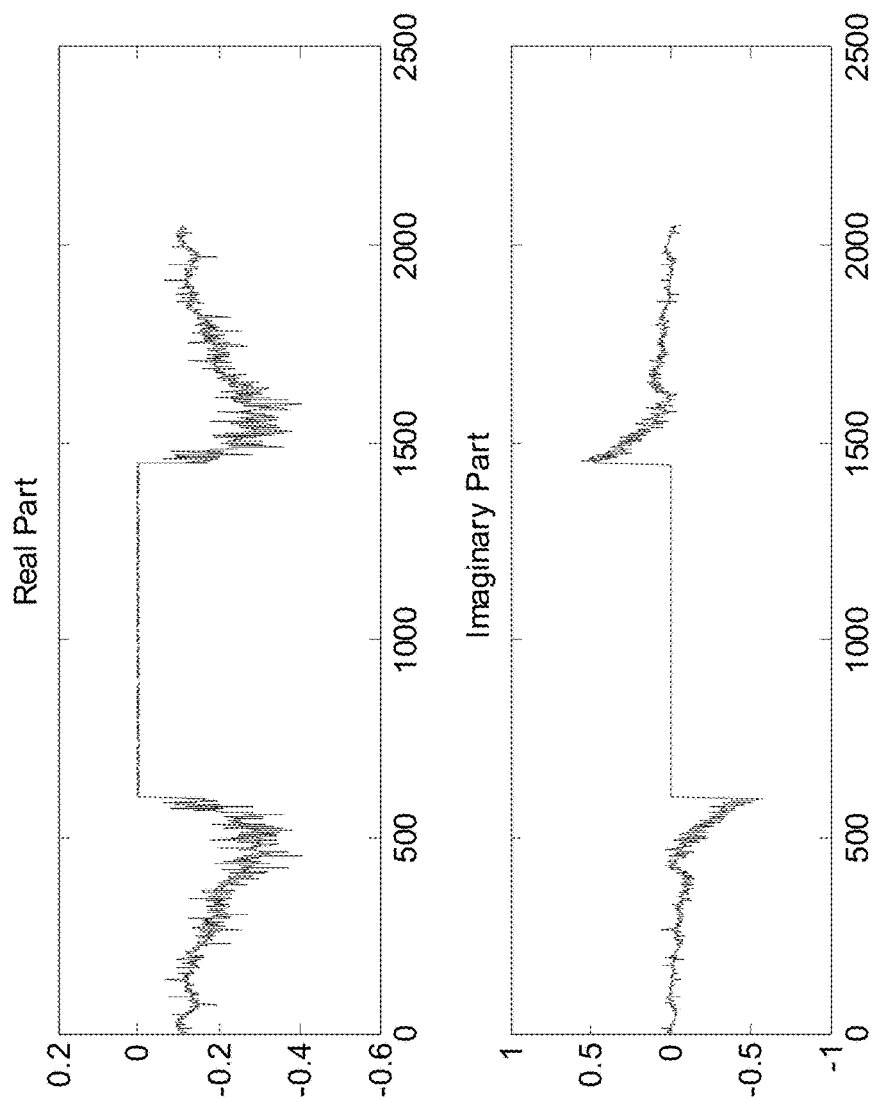
FIG. 12 shows a channel transfer function in some embodiments.
Figure 13:
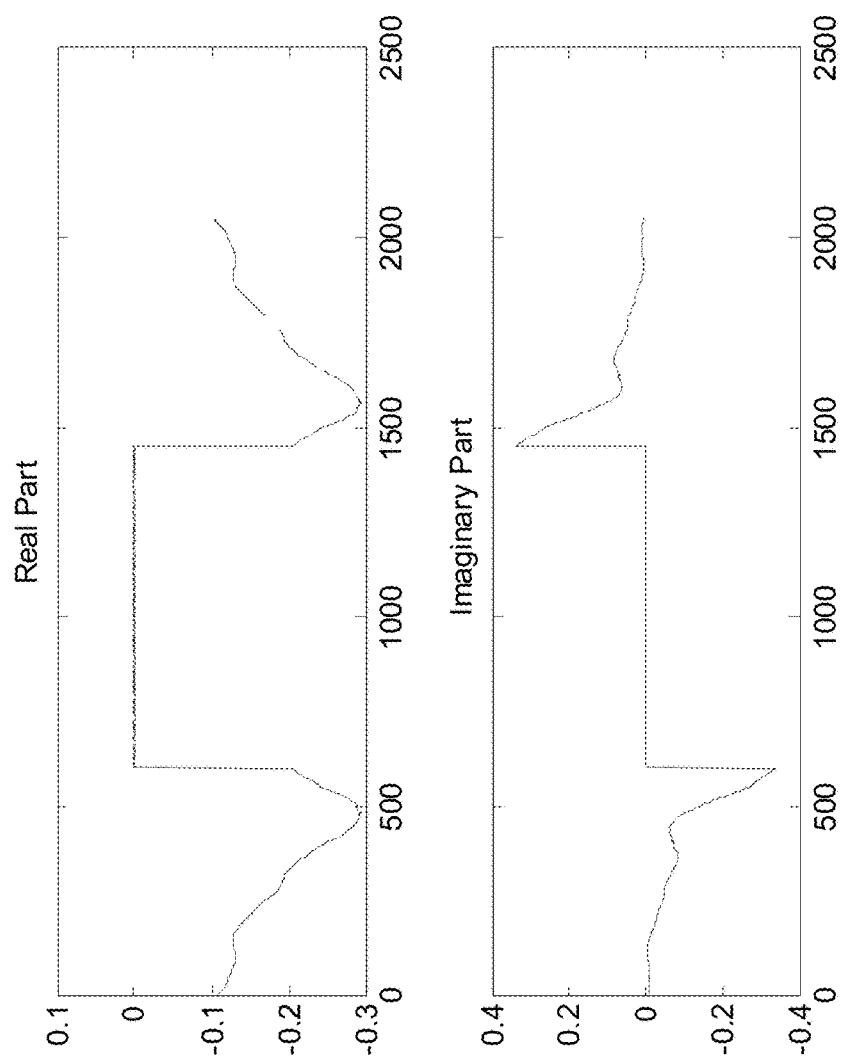
FIG. 13 shows an averaged channel transfer function in some embodiments.

FIG. 12 shows a channel transfer function in some embodiments. The channel transfer function in FIG. 12 is obtained by replacing glitch values of frequency response as described above. FIG. 13 shows an averaged channel transfer function in some embodiments, starting with the channel transfer function estimate, with glitches removed as described with respect to FIG. 12. Comparing FIG. 12 with FIG. 8, FIG. 12 has small noises like FIG. 5 but has no big glitches unlike FIG. 8. The difference between FIG. 13 and FIG. 9 is less obvious, but it will still affect the system performance by about 30%.

Figure 14:
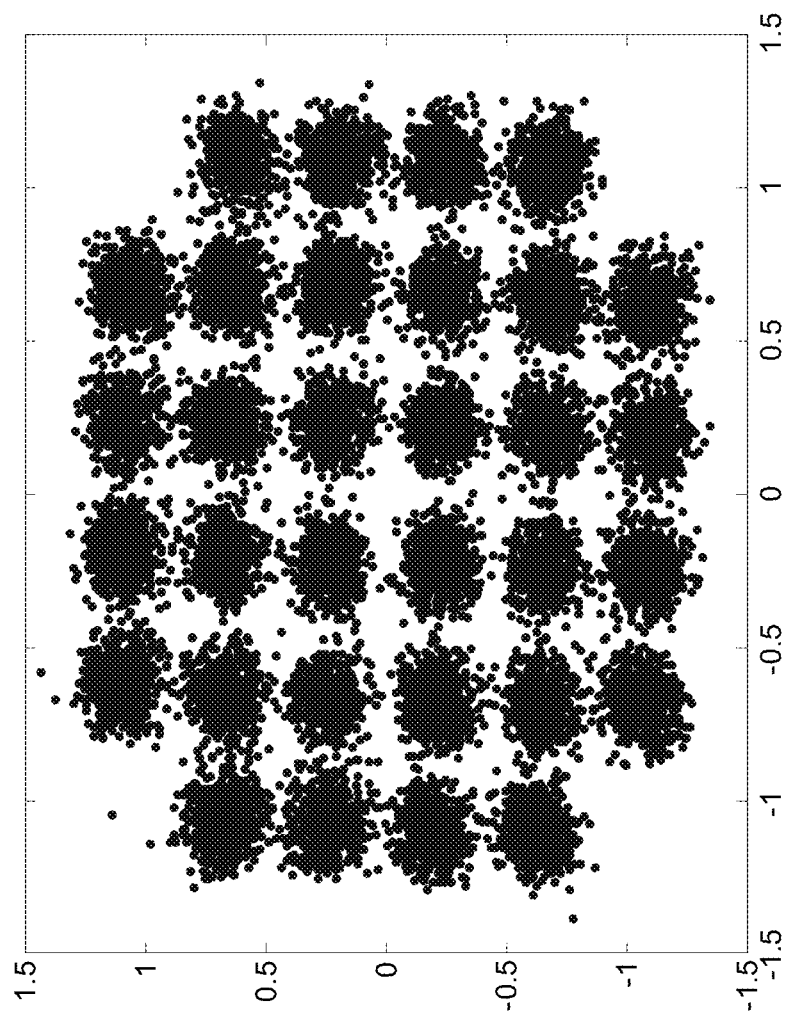
FIG. 14 shows an example of a constellation diagram using ISFA processing.

The constellation diagram of the system obtained by using an embodiment of the glitch-free ISFA method is shown in FIG. 14. The corresponding BER is decreased from $3.98 \times 10^{-3}$ to $2.84 \times 10^{-3}$, which means the new method increases the system performance by about 30%.

Figure 15:
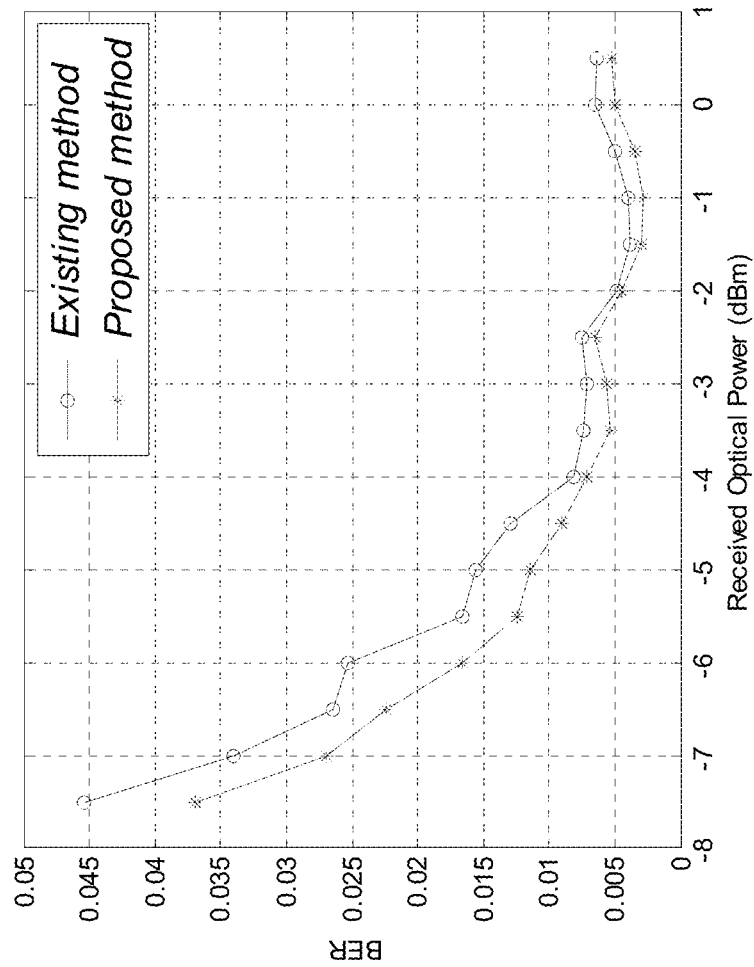
FIG. 15 shows a plot of bit error rate (BER) as a function of received optical power in some embodiments.

FIG. 15 shows BER as function of received optical power measured with respect to systems with an existing ISFA method and systems with the disclosed glitch-free ISFA method. It can be seen from the curves that the disclosed glitch-free ISFA method requires less power for the received signal to obtain the same bit error rate as the existing ISFA method. Or put differently, for the same received signal power, the BER improvement can be significant, e.g., 30%, especially at operational points of lower optical power range.

Figure 16:
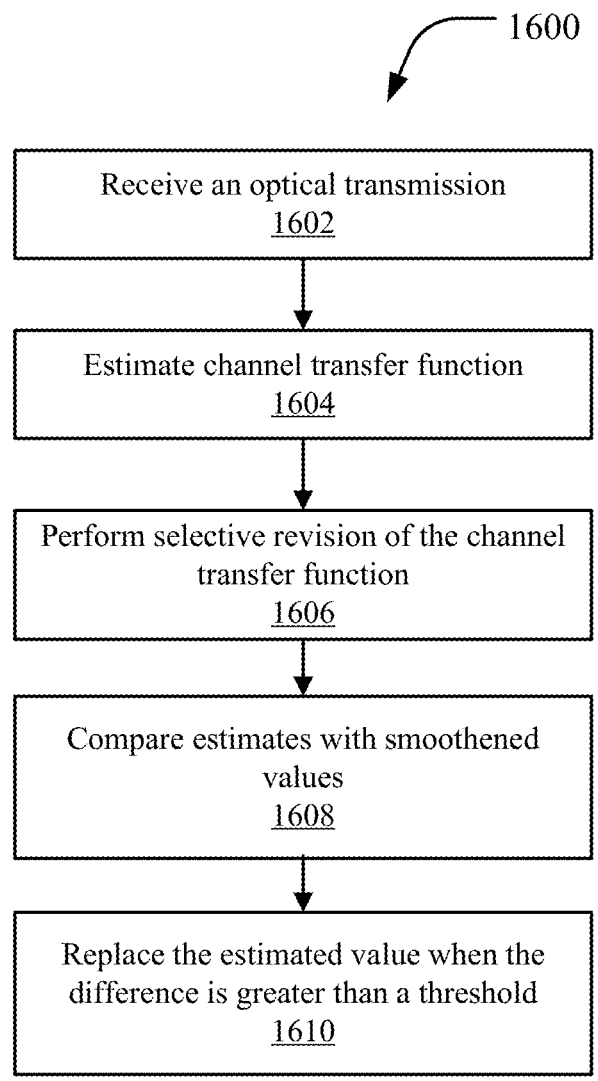
FIG. 16 is a flowchart for an example method of optical communication.

FIG. 16 is a flowchart for an example method 1600 of digital communication. The method 1600 may be implemented at the receiver-side in the communication network.

The method 1600 includes receiving (1602), over a communication channel, a transmission comprising a sequence of modulated symbols. The symbols may represent OFDM or DMT signal transmissions.

The method 1600 includes, estimating (1604), at multiple frequencies, estimated values of a channel transfer function of the communication channel. For example, the channel transfer function may be estimated at 1024 or 2048 different frequency values, uniformly spread over the frequency band over which the channel is estimated.

The method 1600 includes, selectively revising (1606) the estimated values of channel transfer function by reducing glitches in the estimated values of the channel transfer function. For example, the averaging operation as described with respect to FIG. 10 may be used for the reduction of glitches.

In some embodiments, the revising is performed by comparing (1608), at the multiple frequencies, a corresponding estimated value of the channel transfer function with smoothened values of the channel transfer function at the multiple frequencies and replacing (1610), in a revised estimated channel transfer function, the corresponding estimated value of the channel transfer function with the smoothened value when a difference between the corresponding estimated value and the smoothened value is greater than a threshold.

As described in the present document, the threshold may be an absolute number or may be related to the frequency domain estimates as a percent (or fraction) of the values of frequency domain estimates. For example, the threshold may have an absolute value of 0.1, but a threshold between 0.05 and 0.2 was found to be effective. Alternatively, in some embodiments, the threshold may be 0.2 multiplied by the maximum absolute value of the estimated value Hxi of the channel transfer function. Inventors experiments found that in a back-to-back system that is designed to work with a nominal channel gain of unity, using numbers as threshold is an effective way to improve performance as outlined herein.

Figure 17:
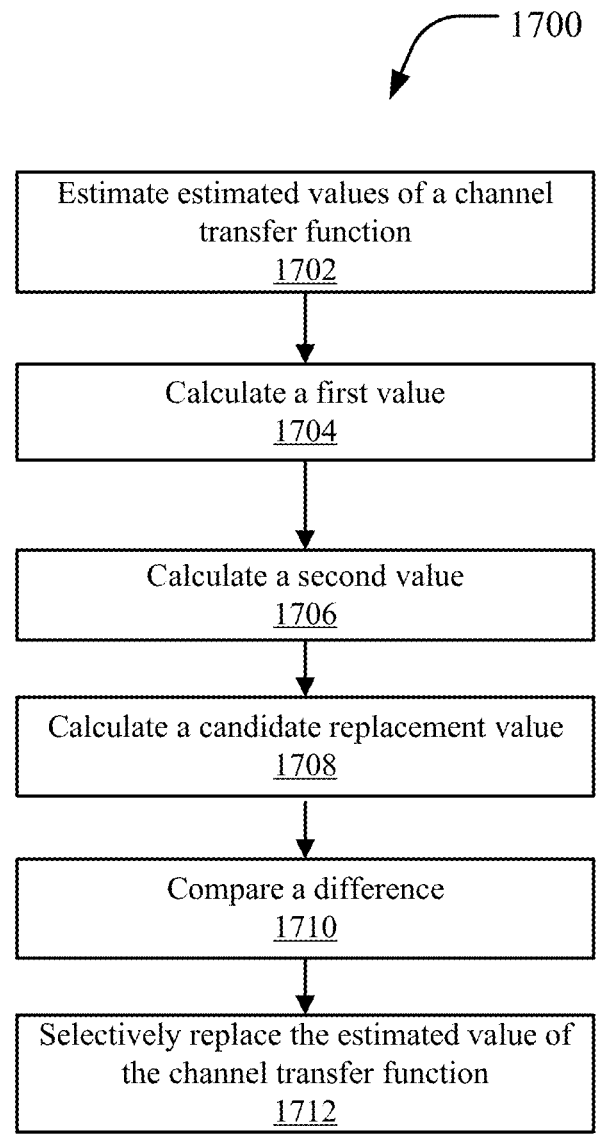
FIG. 17 is a flowchart for an example method of optical communication.

FIG. 17 is a flowchart representation of an example method 1700 of optical communication. The method 1700 may be implemented in a wireless receiver, e.g., receiver 106. The method 1700 may be implemented by a processor of the receiver by reading instructions from a memory and processing optical signals received from an optical front end of the receiver.

The method 1700 includes, at 1702, estimating, at multiple frequencies, estimated values of a channel transfer function of the communication channel.

The method 1700 includes, at 1704, calculating, at a given frequency from the multiple frequencies, a first value based on a first number of estimated values of the channel transfer function at frequencies lower than the given frequency.

The method 1700 includes, at 1706, calculating, at the given frequency, a second value based on a second number of estimated values of the channel transfer function at frequencies higher than the given frequency.

The method 1700 includes, at 1708, calculating a candidate replacement value at the given frequency from the first value and the second value.

The method 1700 includes, at 1710, comparing a difference between the candidate replacement value and the estimated value of the channel transfer function at the given frequency with a threshold.

The method 1700 includes, at 1712, replacing, in a revised estimated channel transfer function, the estimated value of the channel transfer function estimate with the candidate replacement value when the difference is greater than the threshold. An example of how the method 1700 can be implemented is described with respect to FIG. 10.

It will be appreciated that techniques for improving robustness of channel estimation when using frequency domain intra-symbol averaging are disclosed. In some embodiments, BER improvements of as much as 30% can be observed.

It will further be appreciated that the disclosed techniques provide several parameters by which to optimize the performance of the technique. The parameters include number of frequencies at which channel estimates are computed, window sizes for smoothing operation, both at frequencies lower than a given frequency of interest and at frequencies higher than the frequency of interest and a threshold used for comparison and selectively revising channel estimates at different frequency locations.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of digital communication, implementable at a receiver-side in a digital communication network, comprising:
   receiving, over a communication channel, a transmission comprising a sequence of modulated symbols;
   estimating, at multiple frequencies, estimated values of a channel transfer function of the communication channel; and
   selectively revising the estimated values of channel transfer function by reducing glitches in the estimated values of the channel transfer function by:
   comparing, at the multiple frequencies, a corresponding estimated value of the channel transfer function with smoothened values of the channel transfer function at the multiple frequencies; and
   replacing, in a revised estimated channel transfer function, the corresponding estimated value of the channel transfer function with the smoothened value when a difference between the corresponding estimated value and the smoothened value is greater than a threshold.

2. The method of claim 1, wherein the smoothened value of the channel transfer function is computed by averaging a number of values of the channel transfer function in a frequency domain window around the multiple frequencies.

3. The method of claim 2, wherein the threshold is in a range of between 5 percent and 15 percent of the estimated value of the channel transfer function.

4. The method of claim 2, wherein a size of the window is dependent on a number of multiple frequencies at which the channel transfer function is estimated.

5. The method of claim 4, wherein the number of multiple frequencies is 2048 and wherein the size of window is 31 frequency domain samples.

6. The method of claim 2, wherein the smoothened value of the channel transfer function used to be compared with the corresponding estimated value is calculated based on the number of values of the channel transfer function including the corresponding estimated value.

7. The method of claim 6, wherein the smoothened value of the channel transfer function replacing the corresponding estimated value is calculated based on the number of values of the channel transfer function excluding the corresponding estimated value.

8. The method of claim 7, further comprising, after replacing the corresponding estimated value of the channel transfer function, recalculating the smoothened value of the channel transfer function based on the number of values of the channel transfer function including the replaced smoothened value of the channel transfer function.

9. The method of claim 8, further including:
   recovering information bits from the optical transmission based on the revised estimated channel transfer function and recalculated smoothened value of the channel transfer function.

10. The method of claim 2, wherein the threshold is in a range of between 0.05 and 0.2 of a maximum absolute value of the estimated value of the channel transfer function.

11. The method of claim 1, wherein the smoothened value of the channel transfer function is calculated by lowpass filtering frequency domain estimate values and thresholding an output of the lowpass filtering.

12. The method of claim 1, further including:
   recovering information bits from the optical transmission based on the revised estimated channel transfer function.

13. An optical communication receiver apparatus, comprising:
   an optical receiver front end;
   a memory storing instructions; and
   a processor;
   wherein the processor reads instructions from the memory and implements a method of estimating a channel transfer function using a transmission signal received by the optical receiver front end, the method comprising:

estimating, at multiple frequencies, estimated values of a channel transfer function of the communication channel;

calculating, at a given frequency from the multiple frequencies, a first value based on a first number of estimated values of the channel transfer function at frequencies lower than the given frequency;

calculating, at the given frequency, a second value based on a second number of estimated values of the channel transfer function at frequencies higher than the given frequency;

calculating a candidate replacement value at the given frequency from the first value and the second value;

comparing a difference between the candidate replacement value and the estimated value of the channel transfer function at the given frequency with a threshold; and replacing, in a revised estimated channel transfer function, the estimated value of the channel transfer function estimate with the candidate replacement value when the difference is greater than the threshold.

14. The apparatus of claim 13, wherein the first value is calculated by averaging the first number of estimated values of the channel transfer function and the second value is computed by averaging the second number of estimated values of the channel transfer function.

15. The apparatus of claim 14, wherein the first number and the second number are dependent on a number of multiple frequencies at which the estimated values of the channel transfer function are estimated.

16. The apparatus of claim 15, wherein the number of multiple frequencies is 2048 and wherein the first number and the second number are 15, respectively.

17. The apparatus of claim 13, wherein the first number and the second number are equal to each other.

18. The apparatus of claim 13, wherein the threshold is in a range of between 0.05 and 0.15.

19. The apparatus of claim 13, wherein the calculating the first value based on the first number of estimated values of the channel transfer function includes lowpass filtering followed by and thresholding an output of the lowpass filtering.

20. The apparatus of claim 13, wherein the processor further performs:

recovering information bits from the optical transmission based on the revised estimated channel transfer function.

* * * * *